Patented Oct. 2, 1951

2,569,784

UNITED STATES PATENT OFFICE 2,569,784

PROCESS FOR PREPARING TETRA ALKYL ORTHOSILICATE

Frederick A. Smith, Kenmore, N. Y., assignor, by mesne assignments, to Union Carbide and Carbon Corporation, a corporation of New York No Drawing. Application January 27, 1949, Serial No. 73,219

4 Claims. (Cl. 260—448.8)

This invention relates to a novel process for making tetra alkyl orthosilicate.

In accordance with my invention, I react silicon disulfide with an alkanol, such as methanol, ethanol, or propanol, to make tetra alkyl orthosilicate according to the following equation, wherein R is an alkyl radical:

$$SiS_2 + 4\ ROH \rightarrow Si(OR)_4 + 2\ H_2S$$

It is advantageous for at least four mols of the alkanol to be reacted with each mol of silicon disulfide. Also, the hydrogen sulfide liberated should be removed during the course of the reaction.

In one example of how the novel process was carried out a sample of silicon disulfide was placed in a reaction vessel and covered with anhydrous ethanol at room temperature. An exothermic reaction took place without the application of extraneous heat, and hydrogen sulfide was liberated and removed from the reaction vessel. After the reaction had stopped, the liquid was filtered and excess ethanol was boiled off. The remaining liquid recovered as product was identified as tetra ethyl orthosilicate, $(C_2H_5O)_4Si$, by its properties listed below:

Boiling point _____°C__ 165
Refractive index _____ 1.384
Density _____ 0.9374

Tetra ethyl orthosilicate heretofore has been made commercially by reacting silicon tetrachloride with ethanol. My process is considerably more economical because a relatively small weight of silicon disulfide furnishes the same amount of silicon to the reaction as a much larger weight of silicon tetrachloride. Furthermore, my process is advantageous because two mols of easily removed $H_2S$ are produced, whereas four mols of HCl are formed in the silicon tetrachloride reaction.

What is claimed is:

1. A process for making tetra alkyl orthosilicate which comprises reacting one mol of silicon disulfide with at least four mols of alkanol, removing hydrogen sulfide from the reactants, and recovering tetra alkyl orthosilicate as a reaction product.

2. A process in accordance with claim 1 wherein said reacting takes place in the absence of extraneous heat.

3. A process in accordance with claim 1 wherein said alkanol is ethanol.

4. A process for making tetra alkyl orthosilicate which comprises reacting one mol of silicon disulfide with at least about four mols of an anhydrous alcohol of the formula ROH, wherein R is alkyl, removing hydrogen sulfide from the reactants and recovering tetra alkyl orthosilicate as a reaction product.

FREDERICK A. SMITH.

REFERENCES CITED

The following references are of record in the file of this patent:

FOREIGN PATENTS

| Number | Country | Date |
|---|---|---|
| 436,808 | Italy | June 14, 1948 |

OTHER REFERENCES

Fremy, "Ann. Chim. Phys.," Series 3, vol. 38 (1853), page 318.